US009775199B2

(12) United States Patent
Ramaiah et al.

(10) Patent No.: US 9,775,199 B2
(45) Date of Patent: Sep. 26, 2017

(54) LIGHT EMITTING DIODE RETROFIT LAMP FOR HIGH INTENSITY DISCHARGE BALLAST

(71) Applicant: GE Lighting Solutions, LLC, East Cleveland, OH (US)

(72) Inventors: Raghu Ramaiah, Mentor, OH (US); Thomas Clynne, East Cleveland, OH (US); Kyle Decoster, East Cleveland, OH (US)

(73) Assignee: GE LIGHTING SOLUTIONS, LLC, East Cleveland, OH (US)

( * ) Notice: Subject to any disclaimer, the term of this patent is extended or adjusted under 35 U.S.C. 154(b) by 0 days.

(21) Appl. No.: 14/807,114

(22) Filed: Jul. 23, 2015

(65) Prior Publication Data

US 2016/0037598 A1    Feb. 4, 2016

Related U.S. Application Data

(60) Provisional application No. 62/031,366, filed on Jul. 31, 2014.

(51) Int. Cl.
*H05B 33/08* (2006.01)
*F21V 29/83* (2015.01)
*F21V 23/00* (2015.01)
*F21V 29/77* (2015.01)
*F21K 9/232* (2016.01)
(Continued)

(52) U.S. Cl.
CPC ......... *H05B 33/0809* (2013.01); *F21K 9/232* (2016.08); *F21K 9/238* (2016.08); *F21V 23/006* (2013.01); *F21V 29/773* (2015.01); *F21V 29/83* (2015.01); *F21V 3/00* (2013.01); *F21Y 2107/30* (2016.08); *F21Y 2115/10* (2016.08)

(58) Field of Classification Search
None
See application file for complete search history.

(56) References Cited

U.S. PATENT DOCUMENTS 7,434,964 B1    10/2008  Zheng et al.
7,810,974 B2    10/2010  Van Rijswick et al.
(Continued)

FOREIGN PATENT DOCUMENTS

CN    201396602 Y    2/2010
CN    202546496 U    11/2012
(Continued)

OTHER PUBLICATIONS

Dengke Cai et al., U.S. Appl. No. 14/800,714, filed Jul. 16, 2015.
(Continued)

*Primary Examiner* — Crystal L Hammond
(74) *Attorney, Agent, or Firm* — GE Global Patent Operation; Peter T. DiMauro

(57) ABSTRACT

Provided is an LED retrofit lamp interfacing with a high intensity discharge (HID) ballast that includes a lighting source having a plurality of light emitting diodes (LEDs), one or more heat sink components dissipating heat generated by the LEDs, and an LED driver configured to operate the LEDs. The LED retrofit lamp is disposed within an HID housing and the HID ballast is electrically connected with the LED driver, and supplies power to the LED driver for operating the LEDs.

8 Claims, 9 Drawing Sheets

(51) Int. Cl.
*F21K 9/238* (2016.01)
*F21V 3/00* (2015.01)
*F21Y 115/10* (2016.01)
*F21Y 107/30* (2016.01)

(56) References Cited

U.S. PATENT DOCUMENTS

| | | |
|---|---|---|
| 8,277,109 B2 | 10/2012 | Ko |
| 8,446,004 B2 | 5/2013 | Loh et al. |
| 8,534,880 B1 | 9/2013 | Berg et al. |
| 8,596,821 B2 | 12/2013 | Brandes et al. |
| 8,679,626 B2 | 3/2014 | Heo et al. |
| 2002/0041165 A1* | 4/2002 | Cammack .......... H05B 41/2928 315/291 |
| 2004/0263091 A1* | 12/2004 | Deurloo ............ H05B 41/2885 315/246 |
| 2005/0093479 A1* | 5/2005 | Deurloo ............ H05B 41/2885 315/247 |
| 2010/0188026 A1* | 7/2010 | Cook ................... H05B 41/042 315/360 |
| 2011/0140586 A1 | 6/2011 | Wang |
| 2011/0221324 A1 | 9/2011 | Lee |
| 2012/0080699 A1* | 4/2012 | Chowdhury ............. F21V 7/22 257/98 |
| 2012/0238674 A1 | 9/2012 | Atarashi et al. |
| 2012/0287617 A1* | 11/2012 | Mekhtarian ............ A01G 7/045 362/228 |
| 2012/0313518 A1* | 12/2012 | Sun .................... F21V 29/2206 315/32 |
| 2012/0314414 A1* | 12/2012 | Flaherty ............. H05B 33/0803 362/249.02 |
| 2012/0320594 A1 | 12/2012 | Chien |
| 2013/0153943 A1* | 6/2013 | Lee ........................ H01L 33/64 257/91 |
| 2013/0235586 A1* | 9/2013 | Gielen ................. F21K 9/1355 362/294 |
| 2013/0301280 A1 | 11/2013 | Matsuda et al. |
| 2013/0322076 A1 | 12/2013 | Parker et al. |
| 2014/0191672 A1* | 7/2014 | Stack ................. H05B 33/0806 315/188 |

FOREIGN PATENT DOCUMENTS

| | | |
|---|---|---|
| EP | 2292973 A1 | 3/2011 |
| JP | 2007173729 A | 7/2007 |
| JP | 2010182796 A | 8/2010 |
| JP | 2012146425 A | 8/2012 |
| KR | 20130111516 A | 10/2013 |
| WO | 2011024102 A1 | 3/2011 |
| WO | 2013169033 A1 | 11/2013 |

OTHER PUBLICATIONS

A PCT Search Report and Written Opinion issued in connection with Related PCT Application No. PCT/US2015/063583 on Feb. 11, 2016.

PCT Search Report and Opinion issued in connection with corresponding Application No. PCT/US2015/042649, dated Nov. 9, 2015.

\* cited by examiner

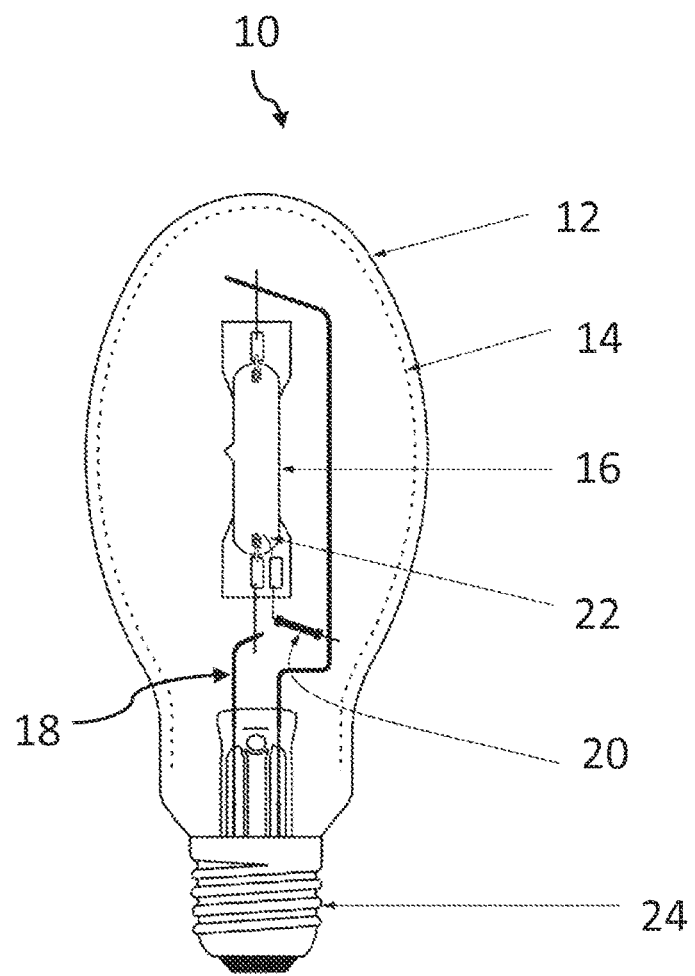
FIG. 1
(Conventional)

LIGHT EMITTING DIODE RETROFIT LAMP FOR HIGH INTENSITY DISCHARGE BALLAST

CROSS-REFERENCE TO RELATED APPLICATION(S)

This application is a non-provisional application claiming priority to Provisional Application Ser. No. 62/031,366 filed Jul. 31, 2014, the contents of which are incorporated herein in their entirety.

TECHNICAL FIELD

The present invention relates generally to light emitting diode (LED) lamps. In particular, the present invention relates a LED retrofit lamp for a high intensity discharge (HID) ballast.

BACKGROUND

A HID lamp is an arc-type lamp which produce light by forming an electric arc between electrodes housed in a fused alumina arc tube or transparent fused quartz filled with gas and metal salts. Once the arc is started using the gas, the metal salts are evaporated to form a plasma. The HID lamp converts input electrical energy into light energy by using input electrical energy to increase the energy in the plasma, producing light based on the collision of electrons and ions with neutral metal atoms.

FIG. 1 illustrates an example of a conventional HID lamp 10 having an outer ellipsoidal-shaped bulb 12 including an internal phosphor coating 14. The HID lamp 10 further includes an arc tube 16 connected to a support structure 18. A starting resistor 20 is connected with a starting electrode 22 for initiating the arc. A lower end of the bulb 12 is seated within a cap 24 for connecting to a power source. A ballast is used to operate the HID lamp 10.

In LED applications, light is generated more efficiently than in the HID applications. Light is generated when a conduction band electron re-combines with a hole in a valance band of the semiconductor. The semiconductor is created by doping a dielectric therein with donor (n-type) or acceptor (p-type) atoms. The LED is created by a sandwich of the n-type and p-type materials, such that the energy drop from conduction to valance band is equal to the energy of the light emitted (i.e., desired frequency or wavelength).

The LED is a structure that includes free electrons and holes such that when an electric field is applied across it, energy is transferred to the electrons and the holes more directly by increasing the drift velocity. Thus, more electrons can make the transition from the valence band to the conduction band, creating holes, and the electrons therefore recombine with holes generating a desired radiation.

SUMMARY OF THE EMBODIMENTS

Embodiments of the present invention provide a LED retrofit lamp for an HID ballast and a method for replacing an existing HID lamp with the LED retrofit lamp and interfacing an LED driver with the existing HID ballast.

In one exemplary embodiment, an LED retrofit lamp interfacing with a HID ballast is provided. LED retrofit lamp includes a lighting source comprising a plurality of LEDs, one or more heat sink components dissipating heat generated by the LEDs, and an LED driver configured to operate the LEDs. The LED retrofit lamp is disposed within an HID housing and the HID ballast is electrically connected with the LED driver, and supplies power to the LED driver for operating the LEDs.

According to yet another exemplary embodiment, a method is provided. The method includes disposing a LED retrofit lamp into an existing HID lamp housing, electrically connecting an LED driver of the LED retrofit lamp with the existing HID ballast, supplying output voltage from the HID ballast to the LED driver, and regulating the output voltage and operating LEDs of the LED retrofit lamp using the regulated DC output voltage The foregoing has broadly outlined some of the aspects and features of various embodiments, which should be construed to be merely illustrative of various potential applications of the disclosure. Other beneficial results can be obtained by applying the disclosed information in a different manner or by combining various aspects of the disclosed embodiments. Accordingly, other aspects and a more comprehensive understanding may be obtained by referring to the detailed description of the exemplary embodiments taken in conjunction with the accompanying drawings, in addition to the scope defined by the claims.

BRIEF DESCRIPTION OF THE DRAWINGS

FIG. 1 is a schematic illustrating an example of a HID lamp.

Figure 2A:
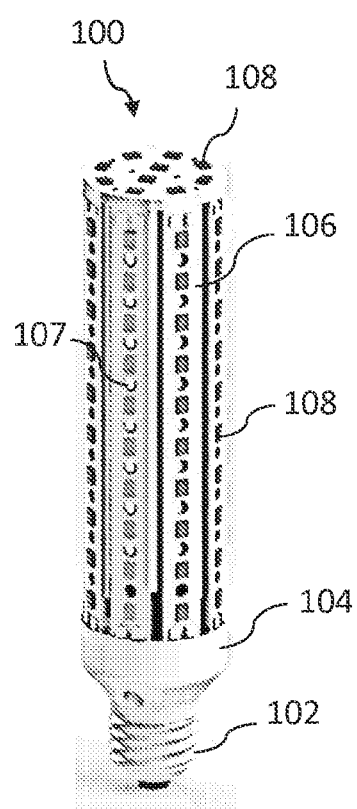
FIGS. 2A and 2B are schematics each illustrating an LED retrofit lamp that can be implemented within one or more embodiments of the present invention.

The drawings are only for purposes of illustrating preferred embodiments and are not to be construed as limiting the disclosure. Given the following enabling description of the drawings, the novel aspects of the present disclosure should become evident to a person of ordinary skill in the art. This detailed description uses numerical and letter designations to refer to features in the drawings. Like or similar designations in the drawings and description have been used to refer to like or similar parts of embodiments of the invention.

DETAILED DESCRIPTION

As required, detailed embodiments are disclosed herein. It must be understood that the disclosed embodiments are merely exemplary of various and alternative forms. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

Embodiments of the present invention provide an LED retrofit lamp for HID lamps and a method for interfacing an LED driver with an existing HID ballast. Details regarding the LED retrofit lamp are described below with reference to FIGS. 2A, 2B and 3.

Figure 2B:
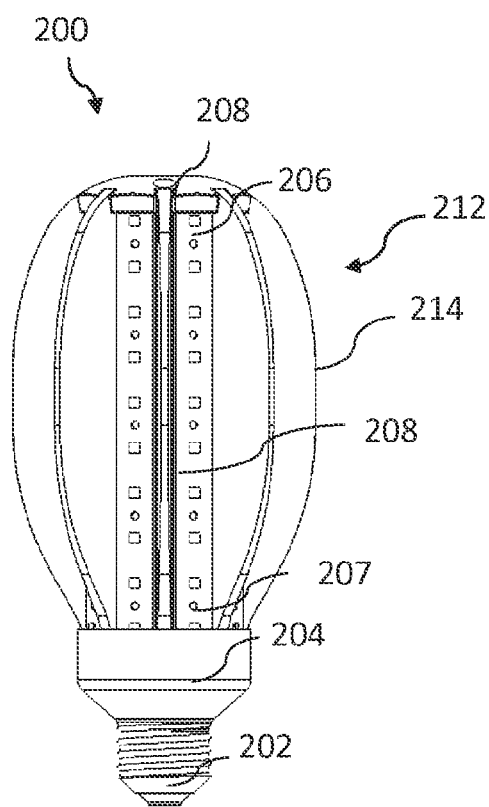

FIGS. 2A and 2B are schematics each illustrating an LED retrofit lamp 100, 200 that can be implemented within one or more embodiments of the present invention. As shown in FIG. 2A, the LED retrofit lamp 100 includes a base 102, a cap portion 104, a printed circuit board (PCB) 106 including openings 107 therein. LEDs 108 are mounted to and thermally connected with the PCB 106, to allow more efficient transfer of heat from the LEDs 108 to the ambient air.

The LED's 108 can be mounted in a linear pattern on the PCB 106, as shown in FIGS. 2A and 2B. This linear pattern extends along a same length as that of an arc-length of a standard HID lamp, and thereby more closely mimic the optical distribution of the HID lamp, as shown in FIG. 8.

Figure 8:
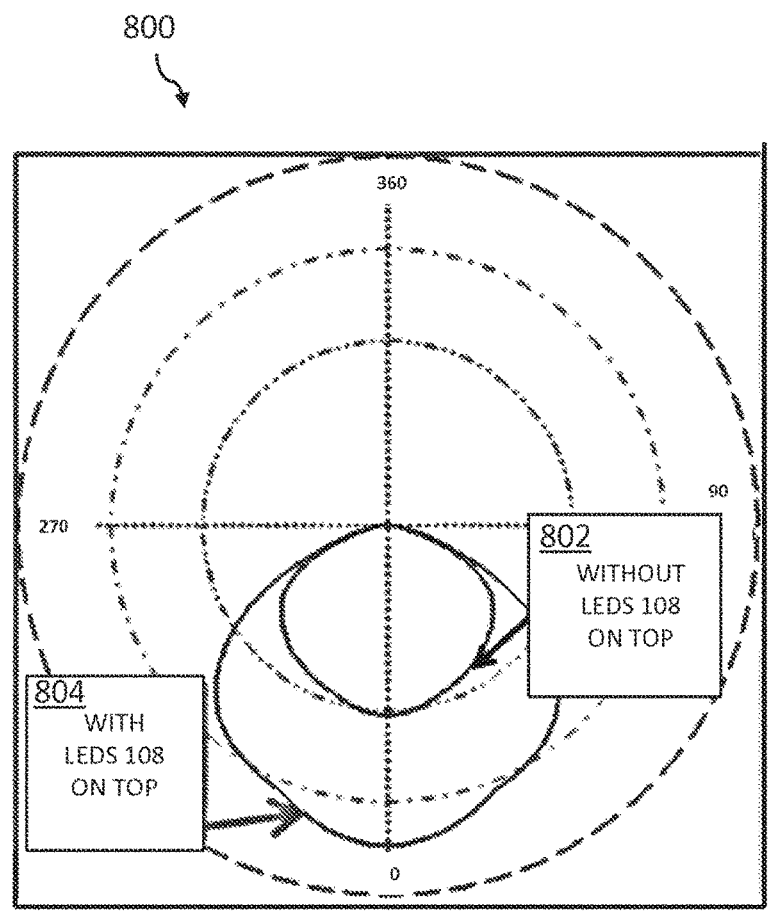
FIG. 8 is a graph illustrating the optical distribution of the LED retrofit lamp according to one or more embodiments of the present invention.

Referring to FIG. 8, as shown in the graph 800, when LEDs 108 are not formed on top of the LED retrofit lamp 100 (see arrow 802), the LEDs 108 produce light at a smaller distance compared to when the LEDs 108 are formed on top of the LED retrofit lamp 100 (see arrow 804)

The openings 107 are formed between the LEDs 108 and allow air flow between the LED 108s, for enhanced cooling. As shown in FIG. 2B, the LED retrofit lamp 200 includes all the elements of LED retrofit lamp 100 including a base 202, a cap portion 204, a PCB 206 including openings 207 and LEDs 208 mounted on the PCB 206. The LED retrofit lamp 200 further includes a heat sink 212 having a plurality of heat sink components (e.g., fins) 214, for better thermal management.

The heat sink fins 214 are formed in a "tulip" shape, however the present invention is not limited hereto and may vary accordingly. The heat sink fins 214 enhance the radiative and convective heat dissipation. The heat sink fins 214 may be formed of a composite structure out of a plurality of predominantly parallel, axially oriented carbon fibers that have been laminated to an underlying material such as a thermo-formable plastic.

A thermal conduction path would be formed from a rear side of the PCB 206 and would be axially along the carbon fibers which are oriented perpendicular to the optical axis of the lamp. The heat is transmitted along the carbon fibers allowing for convective heat transfer to the environment. The heat sink fins 214 may be formed comparable to that disclosed in the Application entitled Crystalline-Graphic-Carbon-Based Hybrid Thermal Optical Element for Lighting Apparatus by Gary Allen et al., the contents of which are incorporated herein by reference.

Figure 3:
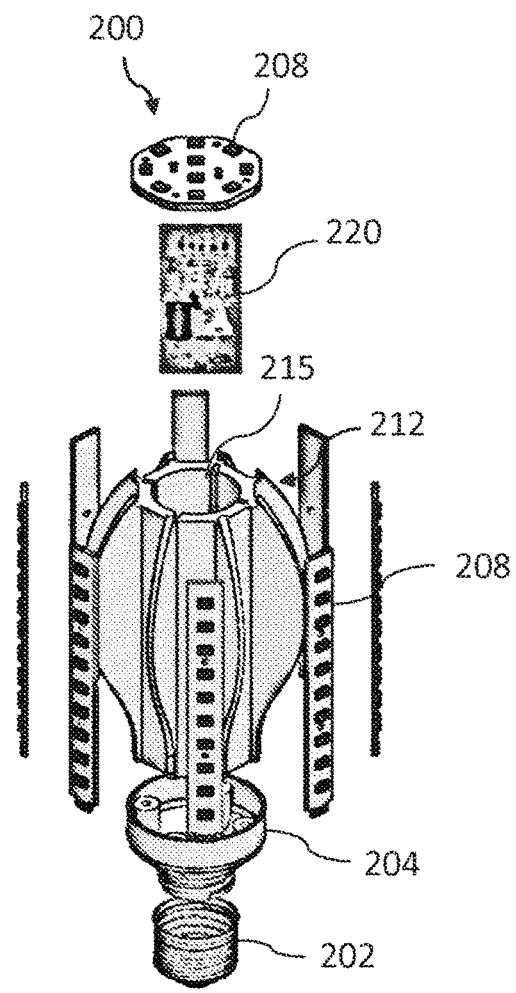
FIG. 3 is an exploded view of the LED retrofit lamp shown in FIG. 2B.

The LED retrofit lamps 100, 200 are supplied power by an LED driver (as depicted in FIG. 3). FIG. 3 is an exploded view of the LED retrofit lamp 200 shown in FIG. 2B. The LED driver 220 is housed within a hollow region 215 of the heat sink 212. LEDs 208 are disposed in the top surface and side surfaces of the LED retrofit lamp 200 to further enhance the illumination and light distribution of the lamp 200. The LED driver 220 includes various electrical components for driving the LEDs 208. Details regarding the LED driver 220 will be discussed below with reference to FIG. 5.

Figure 4:
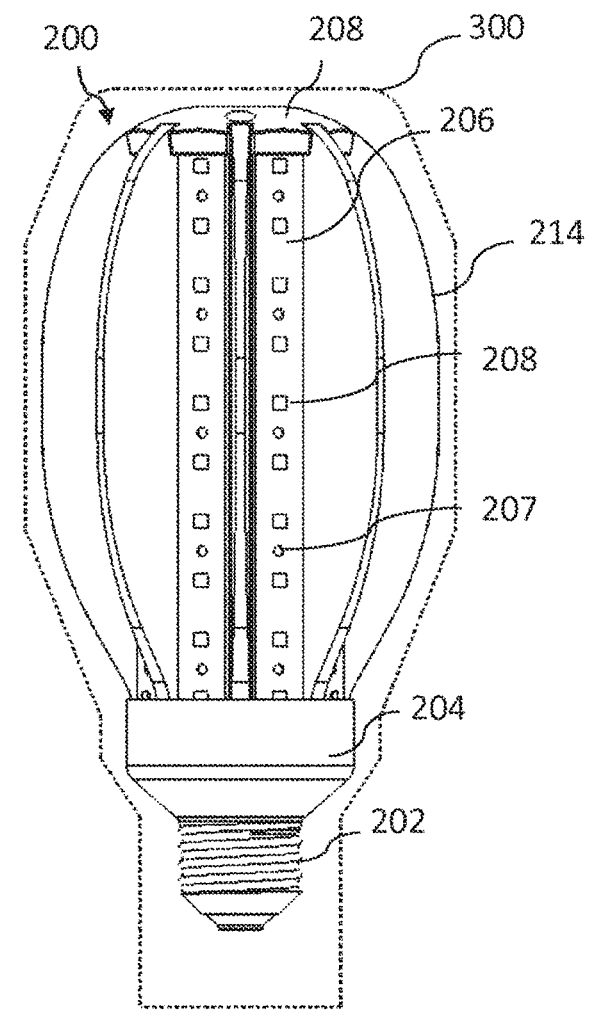
FIG. 4 is a schematic illustrating the LED retrofit lamp disposed within an existing HID lamp housing that can be implemented within one or more embodiments of the present invention.

In accordance with the embodiments, the LED retrofit lamp 100 or 200 is fitted within an existing HID lamp housing 300 (e.g., the HID outer bulb) as shown in FIG. 4. For the purposes of illustration only, the LED retrofit lamp 200 is shown fitting within the HID lamp housing 300. As shown the LED retrofit lamp 200 interfaces seamlessly with the existing HID lamp housing 300. The LED driver 220 shown in FIG. 3 interfaces with the HID ballast associated with the existing HID lamp housing 300.

Details regarding the electrical connection between the LED driver 220 and the HID ballast will now be discussed with reference to FIG. 5.

Figure 5:
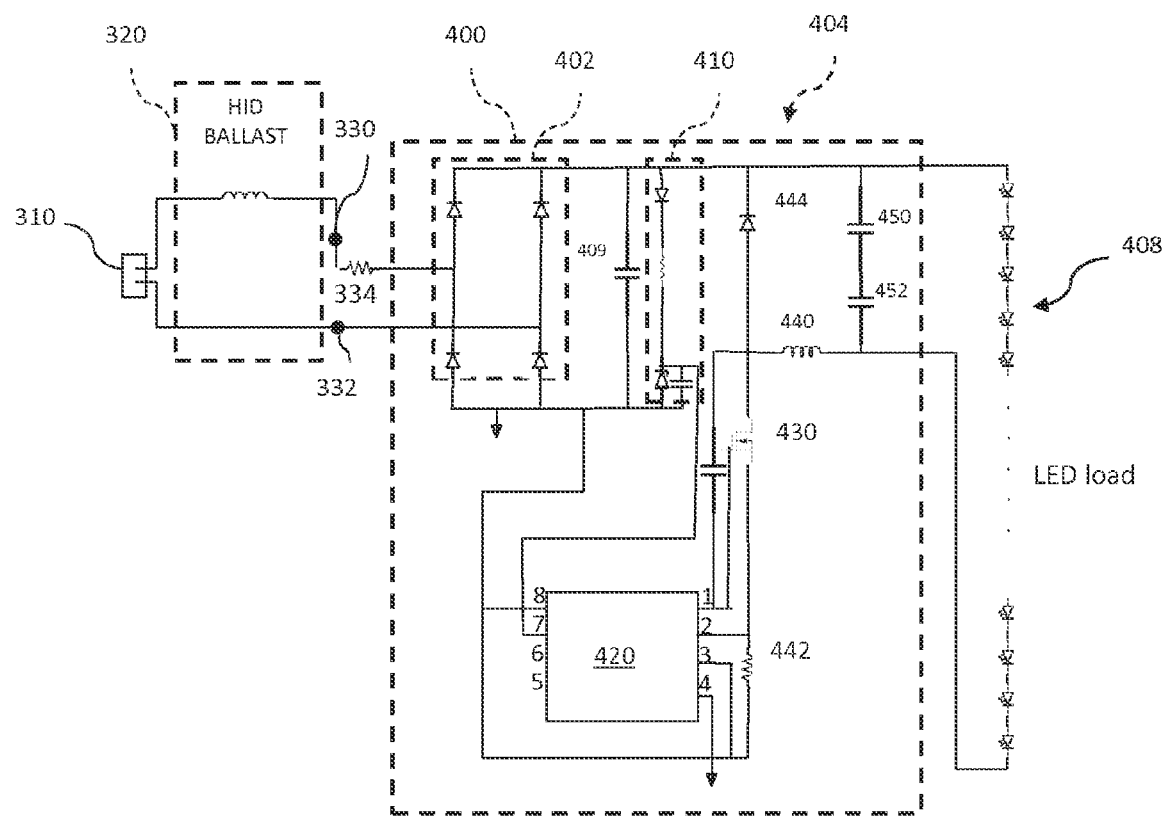
FIG. 5 is a circuit schematic illustrating the electrical connection between a HID ballast and a LED driver in accordance with one or more embodiments of the present invention.

FIG. 5 is a schematic illustration of the electrical connection between a HID ballast 320 and a LED driver 400 in accordance with one or more embodiments of the present invention. As shown in FIG. 5, the HID ballast 320 is a choke ballast however the present invention is not limited hereto and may be applied to all types of HID ballasts. The HID ballast 320 includes an AC input 310 for receiving AC power from an AC power supply, and outputs 330 and 332 of the HID ballast 320 are connected with the LED driver 400.

Output 330 is connected to a bridge rectifier 402 of the LED driver 400 via a fuse 334. The output 332 is connected directly to the bridge rectifier 402, via fuse 334. The bridge rectifier 402 includes a plurality of diodes for delivering a rectified voltage (e.g., DC voltage) to the LED driver 400. The bridge rectifier 402 is connected with a buck circuit 404 for lowering the DC output of the bridge rectifier 402 to a desired DC output for LEDs 408.

The LEDs 408 are representative of the LEDs 108 and 208 of the LED retrofit lamps 100, 200 shown in FIGS. 2A and 2B. The buck circuit 404 includes a capacitor 409 and a voltage divider 410. The rectified voltage is filtered by the capacitor 409, and applied across the voltage divider 410.

The buck circuit 404 further includes a switch controller 420 which is an integrated circuit (IC) that receives a plurality of electrical signals at a plurality of input pins thereof. The switch controller 420 also provides a switch signal to the converting switch 430. The input pins include, for example, a DRIVE pin 1, CS pin 2, BOS pin 3, Ground (GND) pin 4, DIM pin 5, NC pin 6, VCC pin 7 and TEST pin 8. The switch controller 420 is not limited to a particular type of switch controller and therefore include any switch controller suitable for the purpose set forth herein.

The controller supply voltage, Vcc, is applied to the switch controller 420 at the Vcc pin 7 and is used to power the switch controller 420. The converting switch 430 is coupled with the DRIVE pin 1 such that a gate of the converting switch 430 is controlled by the DRIVE pin 1 of the switch controller 420. The converting switch 430 is coupled with an inductor 440 and when the converting switch 430 is closed, the inductor is connected to ground via resistor 442, forming a controlled power switch path for charging and discharging the inductor 440. The buck circuit 404 further includes a diode 444 and two output capacitors 450 and 452.

When the converting switch 430 is switched ON, it is supplying the LED load (i.e., LEDs 408) with current. Initially current flow to the LED load (LEDs 408) is restricted as energy is also being stored in the inductor 440, therefore the current in the LED load and the charge on the output capacitors 450,452 builds up gradually during the 'ON' period. Throughout the ON period, there will be a large positive voltage on the cathode of the diode 444, therefore the diode 444 will be reverse biased and therefore play no part in the action. When the converting switch 430 switches off, the energy stored in the magnetic field around the inductor 440 is released back into the circuit. The voltage across the inductor 440 is then in reverse polarity to the voltage across the inductor 440 during the 'ON' period, and sufficient stored energy is available in the collapsing magnetic field to keep current flowing for at least part of the time the converting switch 430 is open. The inductor 440 now causes current to flow around the circuit via the LED load and the diode 444, which is now forward biased. Once the inductor 440 has returned a large part of its stored energy to the circuit and the load voltage begins to fall, the charge stored in the output capacitors 450, 452 becomes the main source of current, keeping current flowing through the LED load until the next 'ON' period begins.

Figure 6:
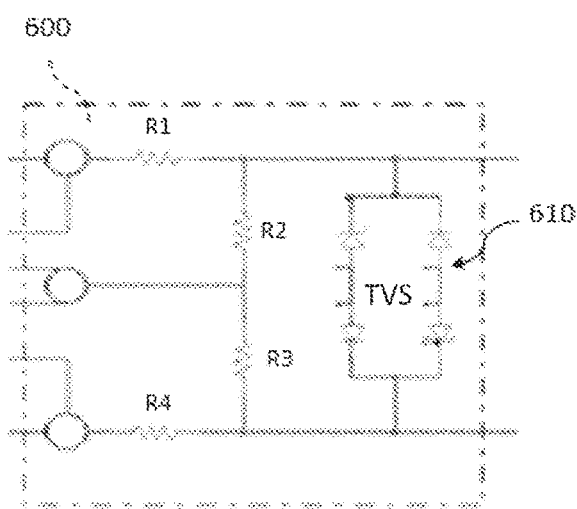
FIG. 6 is a circuit schematic illustrating a HID voltage control circuit that can be implemented within one or more embodiments of the present invention.

By way of example, the HID ballast 320 may be an electromagnetic ballast or an electronic ballast. When the HID ballast 320 is an electromagnetic ballast, it may include igniter. If the HID ballast 320 includes an igniter, HID voltage control circuit 600 shown in FIG. 6 is implemented to clamp a pulse of the igniter to a predetermined acceptable level, prior to transmitting the voltage to the LED driver 400.

The circuit 600 includes a plurality of resistors R1, R2, R3 and R4 and a bi-directional transient voltage suppressor (TVS) diode bridge 610 to eliminate transient voltages (i.e., unwanted spikes or surges) from the HID ballast 320 from being transmitted to the LED driver 400.

The present invention provides several ways to enhance thermal management of the LED retrofit lamps 100, 200 shown in FIGS. 2A and 2B. These additional aspects will now be described below with references to FIGS. 2A, 2B, 7 and 8.

Referring back to FIGS. 2A and 2B, as previously mentioned, the PCBs 106 and 206 may include openings 107, 207 for further enhancing heat dissipation of the LEDs 108 and 208. Further, as shown in FIG. 2B, the heat sink 212 enables the dissipation of additional heat from the LEDs 108 and 208 through the PCBs 106 and 206. The heat sink fins 214 of the heat sink 212 may be formed of one or more material layers including a thermally conductive material and a high reflective material.

Figure 7A:
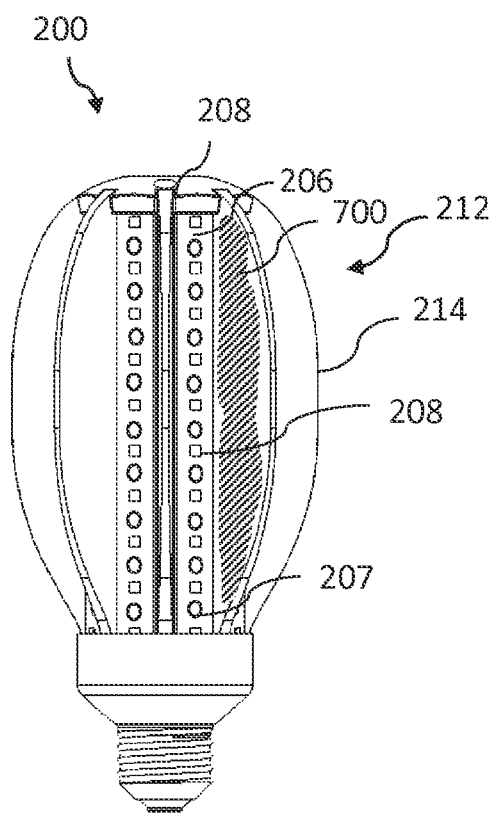
FIGS. 7A and 7B are schematics illustrating LED retrofit lamps according to one or more alternative embodiments of the present invention.

As shown in FIG. 7A, the openings 207 may be larger than that shown in FIG. 2B, for better air flow to thereby further enhance heat dissipation the LEDs 108. Further, the heat sink fins 214 may be coated with a protective coating layer (e.g., a first protective layer 700) including, for example, a conformal coating or gels, or a matte finish coating, a white reflective coating or clear coating to provide a hard scratch abrasion type surface and electrical insulation. The conformal coating or gels cure in place, to form a resilient protective layer on the heat sink surface. This layer can also provide electrical isolation.

Figure 7B:
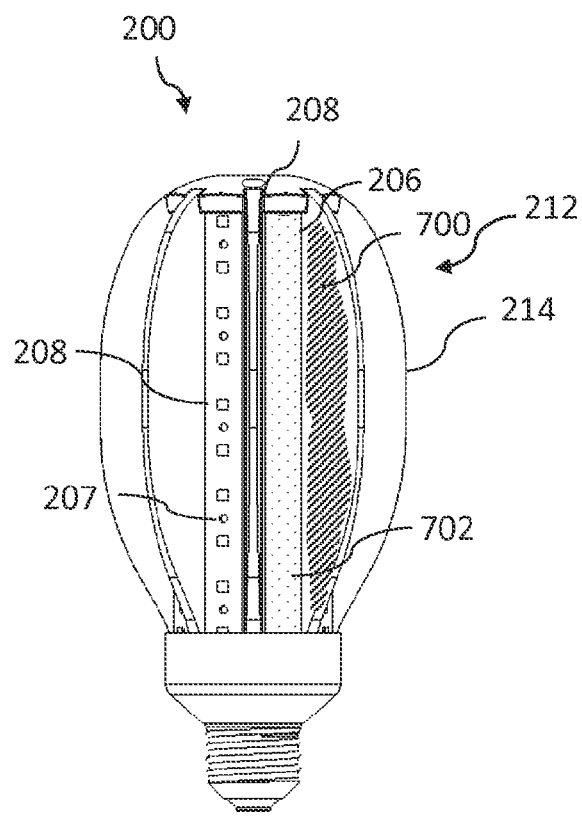

As depicted in FIG. 7B, the heat sink fins 214 may be coated with the first protective coating layer 700 and the LEDs 208 may be coated with a second protective coating layer 702. The second protective coating layer 702 may be formed of the same material as that of the first protective coating layer 700 or of a different material. For example, the second protective coating layer 702 may be an organic polysilazane coating to enable to LEDs 208 exposed without need for any additional protective coating. Another form of this protective layer can be a transparent hard plastic material such as polymethyl methacrylate (PMMA) or polycarbonate shield. In other embodiments, the LED retrofit lamps 100 and 200 may further include a fan to drive more heat transfer from the LEDs 108 and 208 to the ambient air.

Figure 9:
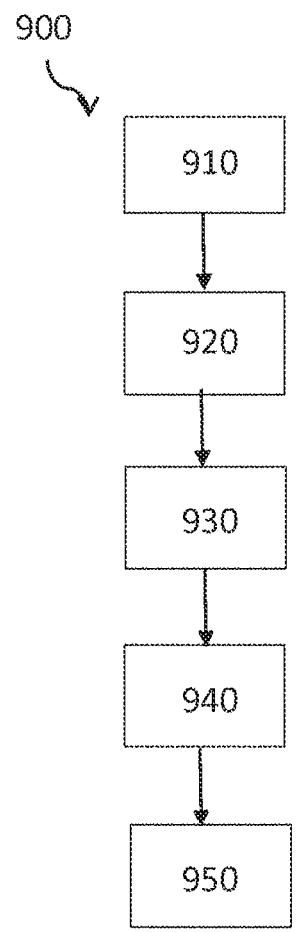
FIG. 9 is a flow diagram for a method replacing an existing HID lamp with the LED retrofit lamp and interfacing an LED driver with the existing HID ballast that can be implemented within one or more embodiments of the present invention.

FIG. 9 is a flow diagram illustrating an exemplary method of replacing an existing HID lamp with the LED retrofit lamp and interfacing an LED driver with the existing HID ballast that can be implemented within one or more embodiments of the present invention. As shown in FIG. 9 with reference made to FIGS. 4 and 5, the method 900 begins at operation 910 where an LED retrofit lamp 200 is disposed within a HID lamp housing 300.

From operation 910, the process continues to operation 920 where the existing HID ballast 320 is electrically connected with the LED driver 400. During operation, at operation 930, input voltage received at the HID ballast 320 is transmitted to the LED driver 400. At operation 940, a bridge rectifier 402 of the LED driver 400 rectifies the voltage received and transmits the voltage to a buck circuit 404 connected thereto. At operation 950, the buck circuit 404 lowers the voltage to a predetermined acceptable level for operating the LEDs 208 of the LED retrofit lamp.

As noted above, if the HID ballast 320 includes an igniter, the igniter pulse is controlled via a HID voltage control circuit 600 between the HID ballast 320 and the input to the LED driver 400, to protect the LED driver 400 from any undesired voltage (e.g., voltage surges or spikes).

Embodiments of the present invention provide the advantages of utilizing an existing HID envelope and ballast and adding the light generation method of an LED retrofit lamp disposed within the existing HID envelope using the LED driver in electrical communication with the HID ballast.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A light emitting diode (LED) retrofit lamp interfacing with a high intensity discharge (HID) ballast, comprising:
   a lighting source including a plurality of LEDs;
   one or more heat sink components dissipating heat generated by the plurality of LEDs;
   an LED driver configured to operate the plurality of LEDs,
   wherein the LED retrofit lamp is disposed within an HID housing and the HID ballast (i) is electrically connected with the LED driver and (ii) supplies power to the LED driver wherein the HID ballast is configured to receive alternate current (AC) power, and output voltage to the LED driver, and the LED driver is configured to receive the output voltage and regulate the output voltage to be supplied to the plurality of LEDs; and
   an HID voltage control circuit disposed between the HID ballast and the LED driver, wherein the HID voltage control circuit is configured to control an HID igniter pulse and to regulate the output voltage being supplied to the LED driver.

2. The LED retrofit lamp of claim 1, further comprising a printed circuit board, the printed circuit board comprising the plurality of LEDs, and a plurality of openings formed between the plurality of LEDs to receive air flow therethrough for heat dissipation.

3. The LED retrofit lamp of claim 2, wherein the plurality of LEDs are arranged along the printed circuit board in a same length as an arc-length of an HID lamp.

4. The LED retrofit lamp of claim 2, wherein the plurality of LEDs are formed on a top surface and side surface of the printed circuit board.

5. The LED retrofit lamp of claim 1, wherein the LED driver is configured to regulate the output voltage to be supplied to the plurality of LEDs by rectifying the output voltage received, and adjusting the rectified voltage, via a buck circuit, to a predetermined acceptable level for operating the plurality of LEDs of the LED retrofit lamp.

6. A method comprising:
disposing a light emitting diode (LED) retrofit lamp into an existing high intensity discharge (HID) lamp housing;
electrically connecting an LED driver of the LED retrofit lamp with an existing HID ballast,
supplying output voltage from the HID ballast to the LED driver;
regulating the output voltage by the LED driver and operating LEDs of the LED retrofit lamp using the regulated output voltage; and
controlling, via an HID voltage control circuit disposed between the HID ballast and the LED driver, an HID ignitor pulse and regulating the output voltage being supplied to the LED driver.

7. The method of claim 6, wherein regulating the output voltage comprises:
rectifying the output voltage received; and
adjusting the rectified voltage, via a buck circuit, to a predetermined acceptable level for operating the LEDs of the LED retrofit lamp.

8. A light emitting diode (LED) retrofit lamp interfacing with a high intensity discharge (HID) ballast, comprising:
a lighting source including a plurality of LEDs;
one or more heat sink components dissipating heat generated by the plurality of LEDs;
an LED driver configured to operate the plurality of LEDs, wherein the LED retrofit lamp is disposed within an HID housing,
wherein the HID ballast is electrically connected with the LED driver and supplies power to the LED driver,
wherein the HID ballast is configured to receive alternate current (AC) power, and output voltage to the LED driver, and the LED driver is configured to receive the output voltage and regulate the output voltage to be supplied to the plurality of LEDs, and
wherein the LED driver is configured to regulate the output voltage by rectifying the output voltage received, and adjusting the rectified voltage, via a buck circuit, to a predetermined acceptable level for operating the plurality of LEDs of the LED retrofit lamp; and
a circuit, including a plurality of resistors and a bi-directional transient voltage suppressor (TVS), configured to eliminate transient voltages from being transmitted from the HID ballast to the LED driver.

* * * * *